Figure 1:
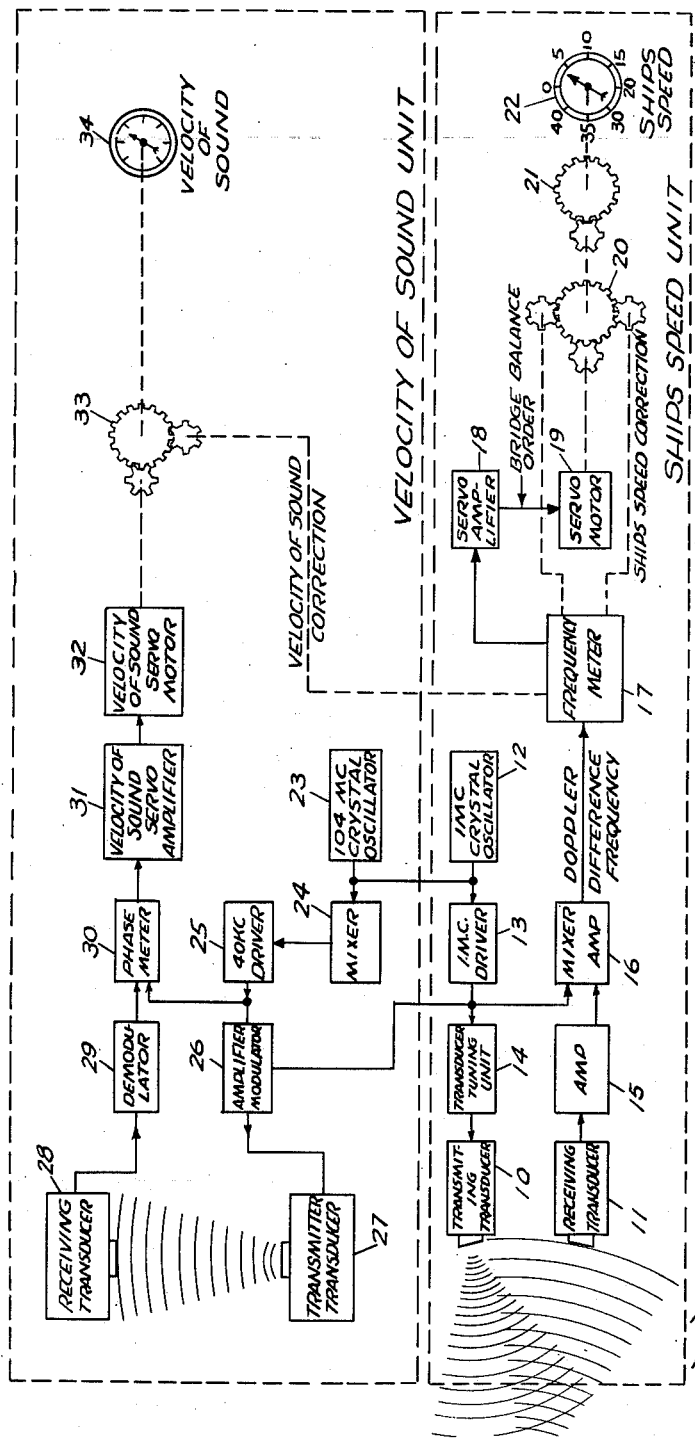

May 22, 1962  N. B. SAUNDERS  3,036,252
FREQUENCY RESPONSIVE SERVOSYSTEM
Original Filed May 25, 1950  2 Sheets-Sheet 1

INVENTOR
NORMAN B. SAUNDERS
By Elmer J. Gorn
ATTORNEY

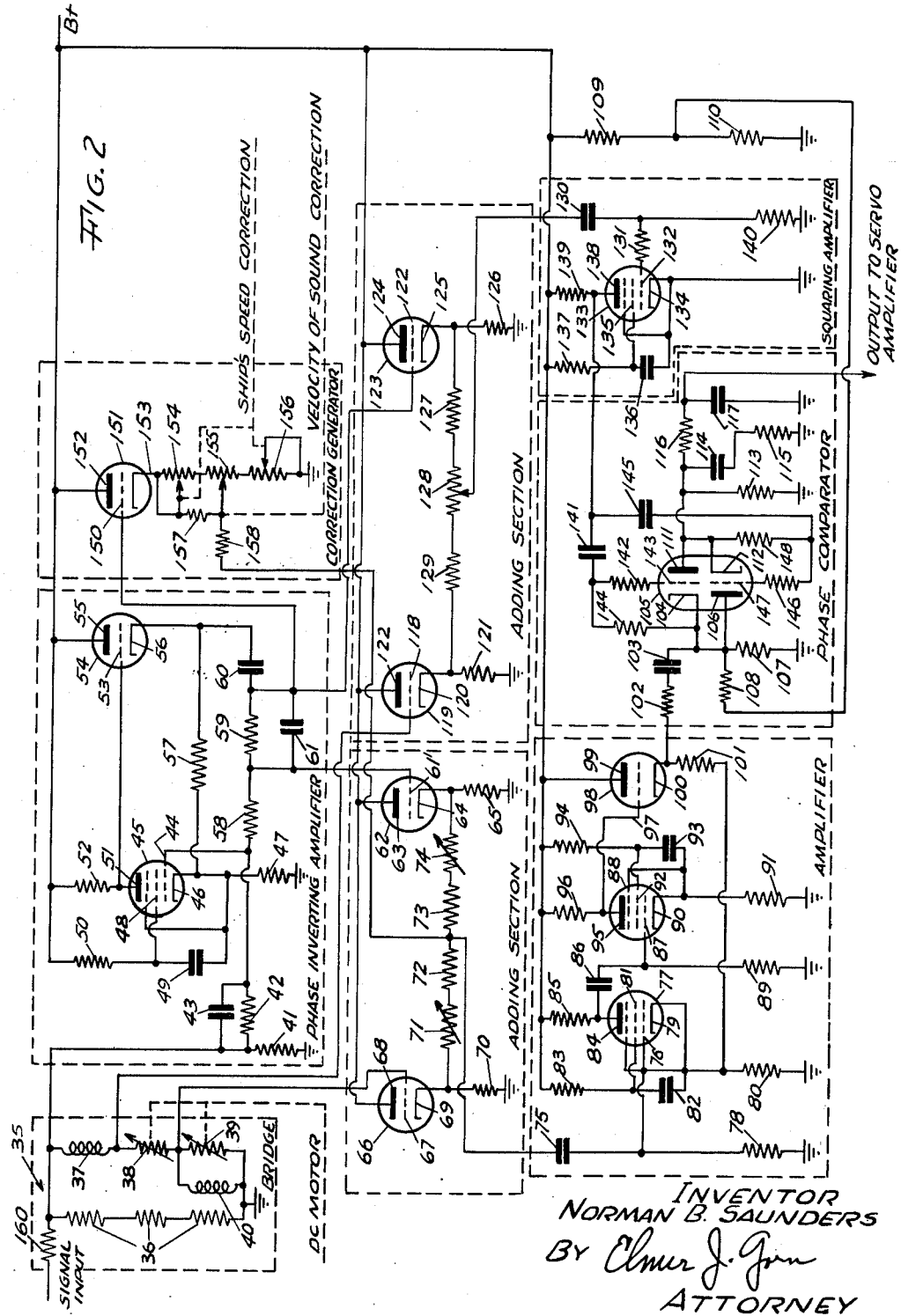

United States Patent Office 3,036,252
Patented May 22, 1962

3,036,252
FREQUENCY RESPONSIVE SERVOSYSTEM
Norman B. Saunders, Weston, Mass., assignor to Raytheon Company, a corporation of Delaware
Original application May 25, 1950, Ser. No. 164,283. Divided and this application Apr. 17, 1956, Ser. No. 579,423
5 Claims. (Cl. 318—28)

This application is a division of application, Serial No. 164,283, filed May 25, 1950, by Norman B. Saunders, now Patent No. 2,841,775.

This invention relates to velocity-determining apparatus, and more particularly to a self-balancing frequency-responsive bridge circuit whereby the difference or Doppler frequency between the transmitted and reflected energy waves may be determined.

It is known that the velocity of a ship traveling through the water may be determined by transmitting sonic waves from the ship through the water in a direction parallel to the direction of the motion of the ship, and receiving waves which are reflected back from discontinuities in the water, such as air bubbles, impurities, and surface conditions, and comparing the frequency of the received waves with the transmitted waves. The difference frequency will vary with the velocity of the ship and, therefore, the velocity of the ship may be measured in terms of this frequency.

This invention discloses a particular system whereby transmitted and received waves may be accurately compared to determine the frequency difference therebetween.

Briefly, the apparatus comprises a frequency-responsive bridge to which the difference frequency is fed and which has a plurality of output signal channels. The output of one of said signal channels becomes zero for a particular or balance frequency, said frequency being determined by the parameters of the bridge.

A second output channel from the bridge produces a signal which bears a phase relation to the first signal such that the difference in phase between these two signals is at all times a multiple of $\pi$ radians. In other words, the second signal is always either in phase with the first signal or 180 degrees out of phase with the first signal. For example, if the incoming frequency is above the balance frequency of the bridge, the second signal is in phase with the first signal, while if the incoming signal is below the balance frequency of the bridge, the second signal is out of phase with the first signal.

These two signals are fed to a phase-comparison circuit, the output of which is a unidirectional signal whose polarity depends upon the relative phase of the two signals. Specifically, the phase-comparison circuit comprises a duo-triode, the anode of one section being connected to the cathode of the second and vice versa.

The first signal is fed to one of the anode-cathode pairs which are tied together, and the other signal is fed through a squaring amplifier to the grids of the duo-triode. The unidirectional signal is developed across an impedance connected to the opposite anode-cathode pair from that to which one input signal is connected. The unidirectional signal output is used to run a servo motor whose direction of rotation depends on the polarity of the unidirectional signal. The servo motor, in turn, is used to vary the circuit parameters of the bridge thereby varying the balance frequency. The result is a self-balancing bridge circuit which automatically balances at the frequency of the incoming signal.

In addition, this invention discloses means whereby corrections may be introduced into the bridge system to compensate for a variety of errors. For example, the velocity of sound in water varies with the density and salinity thereof. To compensate for this variation, a correction circuit is utilized which adds a correction signal to the first signal. This circuit comprises a plurality of variable potentiometers which are fed by a signal derived from the input signal to the bridge. The signal developed at the variable tap of one of the potentiometers is then added to the first signal. The variable tap of the potentiometer is moved by a mechanical linkage ganged to the servo motor whose angular rotational position corresponds to the velocity of sound in water. The velocity of sound in water is determined by measuring the time required to pass a signal between a transmitting and receiving transducer through the water.

Further, this invention discloses the introduction of a correcting signal to compensate for nonlinearities due to variations of the velocity of the ship through the water, these variations being caused, in part, by variations in the density and salinity thereof. This correction is introduced by means of a pair of potentiometers connected in series with said first potentiometer, one at either end thereof with the variable arms thereof being ganged together and each respectively connected to the outer end of its potentiometer. The result is a composite potentiometer having an output which may be varied by either of two inputs, the first input being used to correct the speed of the ship through the water and the second input being used to correct the velocity of sound in water.

Other and further objects and advantages of this invention will be apparent as the description thereof progresses, reference being had to the accompanying drawings, wherein:

FIG. 1 illustrates a functional flow diagram of a system embodying this invention; and FIG. 2 illustrates a schematic diagram of one species of a self-balancing bridge which may be utilized in this invention.

Referring now to FIG. 1, there is shown an apparatus for measuring the velocity of a ship through water comprising a pair of transducers 10 and 11, transducer 10 being the transmitting transducer and transducer 11 being a receiving transducer. By way of example, there is shown a source of signals comprising a one megacycle crystal oscillator 12, the output of which is fed to a one megacycle driver 13 which may be of any desired power amplifier. The output of driver 13 is fed through a transducer tuning unit 14 to the transmitting transducer 10. Sonic signals emitted from transducer 10 are reflected by discontinuities in the water, and the reflected signals are picked up by receiving transducer 11. The signals are fed from the transducer 11 through an amplifier 15 to a mixer amplifier 16. A signal is also fed from the driver 13 to the mixer amplifier 16. The output of mixer amplifier 16 is the Doppler or difference frequency between the signal transmitted by transducer 10 and the reflected signal received by transducer 11. This difference frequency is fed to a frequency meter 17 of the self-balancing bridge type to be described in detail later.

The output of frequency meter 17 is a unidirectional signal which is fed to a servo amplifier 18. The output of servo amplifier 18 is fed to a servo motor 19 which may be, for example, a reversible direct current motor. Motor 19 mechanically drives a gear reduction unit shown diagrammatically at 20. Gear reduction unit 20 has a plurality of outputs, two of which are fed back to the frequency meter 17. One of these two brings the bridge of the frequency meter into balance, and the other introduces a correction into the meter corresponding to the velocity of the ship through the water. A third output from speed reduction unit 20 is fed through a second speed reduction unit 21 to a dial 22 which indicates the ship's speed.

Another mechanical input is fed to the frequency meter 17 for producing a correction therein to compensate for changes in the velocity of sound through water. This input may be controlled in any desired manner. For example, an automatic velocity of sound unit may be utilized which constantly measures the velocity of sound in water. As shown here, the velocity of sound unit comprises a 1.04 megacycle crystal oscillator 23, the output of which is fed to a mixer 24. An output signal from the one megacycle crystal oscillator 12 is also fed to the mixer 24 with the result that the output of mixer 24 is a forty kilocycle signal. This output is fed through a forty kilocycle driver unit 25 to an amplifier modulator unit 26. Also fed to amplifier modulator unit 26 is an input from the one megacycle driver 13 with the result that the output of modulator unit 26 is a one megacycle signal modulated in amplitude at forty kilocycles. This output is fed to a transmitting transducer 27 which converts the signals into sonic waves which are transmitted through the water to a receiving transducer 28. The output of the transducer 28 is fed through a demodulator 29 to a phase meter 30, the output of demodulator 29 being the modulation frequency of forty kilocycles.

A signal from the forty kilocycle driver 25 is also fed to the phase meter 30, and the output of phase meter 30 becomes a unidirectional signal whose polarity is determined by the relative phase of the two signal inputs thereto. The unidirectional signal from phase meter 30 is fed through a servo amplifier 31 to a reversible direct current motor 32 which is connected to a gear reduction unit 33. One output of gear reduction 33 may be connected to a dial 34 for indicating the velocity of sound in water, and another output from gear reduction 33 is fed to the frequency meter 17 to produce the correction therein for changes in the velocity of sound through water.

It is to be clearly understood that other methods for determining the velocity of sound in water could be used. For example, it could be computed from the temperature and salinity of the water and the correction introduced into the frequency meter 17 manually.

Referring now to FIG. 2, there is shown one type of frequency meter which could be used for meter 17. This meter comprises a frequency-responsive bridge circuit 35 utilizing here, by way of example, a modified Wein bridge. Bridge 35 comprises a plurality of resistors 36 connected in series between the signal input and ground, and an impedance comprising an inductance 37, a variable resistor 38 in series with inductance 37, a variable resistor 39 in series with variable resistor 38 and inductance 37, and an inductance 40 in parallel with variable resistor 39. The arms of variable resistors 38 and 39 are mechanically ganged together and driven by one of the outputs of gear reduction unit 20. The impedance comprising elements 37–40 is connected between the signal input and ground.

The signal input is further connected through a resistor 41 to ground, and through a resistor 42 and condenser 43 in parallel to the grid 44 of a phase-inverting amplifier tube 45. The cathode 46 of tube 45 is connected to ground through a biased resistor 47. The screen grid 48 is connected to the cathode through a bypass condenser 49 and to B+ through a voltage dropping resistor 50. The plate 51 is connected through a load resistor 52 to B+ and to the grid 53 of a cathode follower tube 54. The plate 55 of tube 54 is connected to B+, and the cathode 56 thereof is connected through a load resistor 57 to the cathode 46 of tube 45. Grid 44 of tube 45 is connected through a resistor 58, a resistor 59 and a condenser 60, all in series to the cathode 56 of tube 54. Resistor 59 is shunted by a condenser 61.

The parameters of the circuits connected to the amplifier 45 of the cathode follower 54 are so chosen that the junction between resistors 58 and 59 has a potential which is equal to one third of the potential of the input signal to the bridge 35 and is 180 degrees out of phase therewith for all frequencies. Similarly, the junction between resistor 59 and condenser 60 is adjusted to be equal to two-thirds of the potential of the input signal for all frequencies and 180 degrees out of phase therewith. The junction between resistors 58 and 59 is connected to the grid 61′ of a cathode follower 62 which is one component of a signal adding network. The plate 63 of cathode follower 62 is connected to B+, and the cathode 64 is connected to ground through a load resistor 65.

Another component of the adding network is a second cathode follower 66, the grid 67 of which is connected to the junction between resistors 38 and 39 in the bridge circuit 35. The plate 68 of cathode follower 66 is connected to B+, and the cathode 69 is connected through a load resistor 70 to ground. Cathode 69 is connected through a variable resistor 71, a resistor 72, a resistor 73, and a variable resistor 74, all in series, to the cathode 64 of tube 62. The junction between resistors 72 and 73 constitutes the output of the adding network and is connected through a coupling condenser 75 to the grid 76 of an amplifier tube 77. Grid 76 is connected to ground through a grid load resistor 78. The cathode 79 of tube 77 is connected to ground through a cathode bias resistor 80. The screen grid 81 is connected to the cathode through a bypass condenser 82 and to B+ through a voltage dropping resistor 83. The plate 84 is connected to B+ through a plate load resistor 85 and through a coupling condenser 86 to the grid 87 of a second amplifier tube 88. Grid 87 is connected to ground through a grid load resistor 89. Cathode 90 of tube 88 is connected to ground through a cathode bias resistor 91. The screen grid 92 is connected to the cathode through a signal bypass condenser 93 and to B+ through a voltage dropping resistor 94. The plate 95 of tube 88 is connected to B+ through a plate load resistor 96 and to the grid 97 of a cathode follower tube 98. The plate 99 of cathode follower tube 98 is connected to B+, and the cathode 100 thereof is connected through a resistor 101 to the cathode 79 of tube 77 thereby providing substantial degenerative feedback through the amplifier section comprising tubes 77, 88 and 98.

The cathode 100 of tube 98 is connected through a resistor 102 and condenser 103 in series to the cathode 104 of a duo-triode 105 which comprises a phase-comparison circuit. The cathode 104 of one triode section is connected to the anode 106 of the other triode section and to ground through a load resistor 107. Cathode 104 is also connected through a resistor 108 to the tap of a voltage divider network comprising resistors 109 and 110 connected in series between B+ and ground. The anode 111 of the triode section having a cathode 104 is connected to the cathode 112 of the other triode section and to ground through a resistor 113. Anode 111 is also connected to ground through a condenser 114 and resistor 115 in series. Anode 111 is also connected to ground through a resistor 116 and condenser 117 in series. The junction between resistor 116 and condenser 117 comprises the output of the phase-comparison network and is a unidirectional signal whose polarity varies in a manner to be described presently. This output is fed through a servo amplifier to actuate a servo motor which adjusts resistors 38 and 39 in the bridge circuit.

A second signal is fed to the comparison tube 105 through the grids thereof as follows. The junction between inductance 37 and resistor 38 in the bridge 35 is connected to the grid 118 of a cathode follower 119 which is one component of a second adding circuit. The cathode 120 of tube 119 is connected to ground through a cathode load resistor 121, and the plate 122 thereof is connected to B+. The junction between resistor 59 and condenser 60 is connected to the grid 122 of a cathode follower 123 making up another component of the second adding circuit. The plate 124 of tube 123 is connected to B+, and the cathode 125 thereof is connected to ground through a cathode load resistor 126. Cathode 125 is connected through a resistor 127, potentiometer 128 and a resistor 129, all in series, to the cathode 120 of tube 119.

The variable arm of potentiometer 128 is connected through a coupling condenser 130 and grid-current limiting resistor 131 to the grid 132 from a squaring amplifier tube 133. The cathode 134 of tube 133 is grounded. The screen grid 135 is connected through a bypass condenser 136 to the cathode and through a voltage dropping resistor 137 to B+. The plate 138 is connected through a plate load resistor 139 to B+. The junction between resistor 131 and condenser 130 is connected to ground through a grid load resistor 140. The plate 138 is connected through a coupling condenser 141 and grid-current limiting resistor 142 to the grid 143 of the triode section having cathode 104 and plate 111. The junction between condenser 141 and resistor 142 is connected to cathode 104 through a grid load resistor 144. Plate 138 is connected through a coupling condenser 145 and a grid-current limiting resistor 146 to grid 147 of the triode section containing cathode 112 and anode 106. The junction between resistor 146 and condenser 145 is connected to cathode 112 through a resistor 148.

The operation of this device will now be described. An input signal is applied across the bridge which may be, for example, a sine wave having a voltage on the order of fifteen volts. This signal is fed through the inverter tube 45 and the cathode follower 54, the circuit parameters associated with these two tubes being designed such that the output is an extremely linear function of the input for all frequencies and inverted in phase with respect to the input.

The signal fed to the adding tube 62 is, therefore, out of phase with the signal fed to the adding tube 66. Therefore, by adding these two signals through the adding section, the difference between one third of the input signal voltage and the voltage appearing across variable resistor 39 is obtained at the output of the adding section. For a particular frequency, and for particular values of the components of the bridge, the output of this adding tube will be zero. However, for any other frequency, the output will be a finite value and will be amplified through the amplifier tubes 77 and 88 and the cathode follower 98 thereby applying a sinusoidal signal to the cathode 104 and the anode 105 of the duo-triode section. Due to the large degeneration in the amplifying tube, the output thereof is relatively linear.

Similarly, the adding section comprising tubes 119 and 123 measures the difference voltage between the junction of choke 37 and resistor 38, and two thirds of the input voltage. The output of this is fed through the squaring amplifier 133 which clips the peaks of the sinusoidal wave form to form a substantial rectangular wave, said rectangular wave then being applied to the grids of the duo-triode section.

If the rectangular wave drives the grids positive at the time cathode 104 is being driven negative, current will flow from cathode 104 to anode 111 thereby developing a negative unidirectional output potential across the condenser 117. Similarly, if the grids of the triode section are driven positive when anode 106 is being driven positive, a potential will be developed across condenser 117.

The filter section comprising components 113 through 117 is designed to exactly match the components 102, 103, 108, and 107 at the input side of the triode section. This results in an equalization of the surge impedances for current flow in either direction in the triode section. In addition, by connecting the grids 143 to 147 back to the cathodes, the current drawn by the grids is fed back to the cathode from which it was drawn to the grid and, therefore, creates no error in the zero balance of the unidirectional output signal.

The output signal is then used to drive a servo motor which may be, for example, a reversible direct current motor through a servo amplifier, said motor varying the resistors 38 and 39 whereby the frequency at which the bridge 35 will produce a zero output from the adding sections 66 and 62 will be varied. Due to the action of the reference voltage developed from the bridge 35 at the output of the adding sections 119 and 123, the polarity of the output of the duo-triode section will be such that the motor always drives the variable resistors 38 and 39 toward the balance condition of the bridge, thus producing a self-balancing circuit.

The connection of anode 106 and cathode 104 to the voltage divider network 109 and 110 through resistor 108 applies a very small positive potential, on the order of a fraction of a volt, to anode 106 and cathode 104 which in the absence of a signal input from cathode follower 98 produces a small positive output across condenser 117. The polarization of the servo systems is such that this positive signal drives the bridge 35 and ship's speed indicator 22 to zero. Thus, if the signal input to bridge 35 remains zero for an appreciable length of time such as occurs where the ship is not moving or moving at such slow speeds that the Doppler frequency is below 60 cycles corresponding to .1 knot to which the system will not respond, drifting of the servo control system to indicate erroneous speeds is prevented by the positive voltage.

In order to add a correction to the system which will compensate for variations in the velocity of sound in water and the velocity of the ship through the water, a component is added to the output signal of the adding sections 62 and 66 in the following manner. The junction between resistor 59 and condenser 60 which corresponds to two thirds of the input voltage is fed to the grid 150 of a cathode follower tube 151, the plate 152 of which is connected to B+, and the cathode 153 of which is connected through potentiometers 154, 155 and 156, all in series, to ground. The cathode 153 is connected to the movable arm of potentiometer 154 thereby making potentiometer 154 a variable resistor. The cathode 153 is also connected through a resistor 157 to the movable arm of potentiometer 155. The movable arm of potentiometer 156 is connected to ground thereby making potentiometer 156 a variable resistor.

The arm of potentiometer 155 is actuated by a servo motor whose rotational position varies as a function of velocity of sound in the water. The arms of potentiometers 154 and 156 are mechanically ganged together and to the servo motor which balances the bridge 35 thereby introducing a correction corresponding to the input frequency to bridge 35 and which, therefore, is a function of the speed of the ship through the water. The arm of potentiometer 155 is connected through a resistor 158 to the junction between resistors 72 and 73. Thus, it may be seen that a predetermined proportion of the input signal is fed into the adding sections 62 and 66, said portion being controlled first in response to the speed of the ship and second in response to the velocity of sound in the water.

It may be noted that the potentiometer arrangement 154 through 156 could have substituted therefor a mechanical arrangement embodying a single potentiometer whereby the speed correction could be applied to the movable arm of the potentiometer, and velocity of sound could be applied to the case of the potentiometer thereby moving the resistance card thereof relative to the movable arm. This correction, in effect, varies the frequency which the bridge 35 will balance thereby causing a change in the rotational position of the servo motor with the resultant change in the indication of the sound of the ship through the water.

Since the phase reference signal is fed to the phase comparator only when an input signal is present, the system works accurately even when the input signal is discontinuous and erratic.

As shown here, the signal input to bridge 35 is fed through a resistor 160. Since the impedance of the bridge is lower at low frequencies, a smaller proportion of the over-all input signal is fed to the bridge at low frequencies. This compensates for the characteristic of the bridge system to react quicker at low frequencies.

This completes the description of the particular embodiment of the invention described herein. However, many modifications thereof will be apparent to persons skilled in the art without departing from the spirit and scope of this invention. For example, other types of bridges could be used, and the invention is not necessarily limited to the particular type of phase-comparison triode section described herein.

Furthermore, the system is not limited to the measurement of speed of ships through the water but is also applicable to the use of sound to measure the velocity of objects through the air, and, in addition, could use electromagnetic radiations rather than sonic radiations. Therefore, applicant does not wish to be limited to the particular details of the invention described herein, except as defined by the appended claims.

What is claimed is:

1. A frequency-responsive electron-discharge device comprising a bridge circuit having first and second output terminals and a phase inverter circuit having first and second output terminals; means for applying an input signal to each of said circuits; a first channel means including a first comparison means having two inputs, one of said inputs connected to said first bridge output terminal and the other of said inputs connected to said first phase inverter output terminal, said first comparison means thereby adding the output signals produced at said first bridge and said first phase inverter output terminals to derive a first control signal; a second channel means including a second comparison means having two inputs, one of said inputs connected to said second bridge output terminal and the other of said inputs connected to said second phase inverter output terminal, said second comparison means thereby adding the output signals produced at said second bridge and said second phase inverter output terminals to derive a second control signal the phase of which always differs from the phase of said first control signal by an integral multiple of $\pi$ radians.

2. A frequency-responsive electron-discharge device comprising a bridge circuit having first and second output terminals and a phase inverter circuit having first and second output terminals; means for applying an input signal to each of said circuits; a first channel means including a first comparison means having two inputs, one of said inputs connected to said first bridge output terminal and the other of said inputs connected to said first phase inverter output terminal, said first comparison means thereby adding the output signals produced at said first bridge and said first phase inverter output terminals to derive a first control signal, said first control signal being zero for a balance frequency; a second channel means including a second comparison means having two inputs, one of said inputs connected to said second bridge output terminal and the other of said inputs connected to said second phase inverter output terminal, said second comparison means thereby adding the output signals produced at said second bridge and said second phase inverter output terminals to derive a second control signal the phase of which differs by an even multiple of $\pi$ radians from the phase of said first control signal when the frequency of said input signal is above the balance frequency of said bridge and the phase of which differs by an odd multiple of $\pi$ radians from the phase of said first control signal when the frequency of said input signal is below the balance frequency of said bridge.

3. A frequency-responsive electron-discharge device comprising a bridge circuit having first and second output terminals and a phase inverter circuit having first and second output terminals; means for applying an input signal to each of said circuits; a first channel means including a first comparison means having two inputs, one of said inputs connected to said first bridge output terminal and the other of said inputs connected to said first phase inverter output terminal, said first comparison means thereby adding the output signals produced at said first bridge and said first phase inverter output terminals to derive a first control signal; a second channel means including a second comparison means having two inputs, one of said inputs connected to said second bridge output terminal and the other of said inputs connected to said second phase inverter output terminal, said second comparison means thereby adding the output signals produced at said second bridge and said second phase inverter output terminals to derive a second control signal the phase of which always differs from the phase of said first control signal by an integral multiple of $\pi$ radians; phase comparison means having a first input connected to said first channel means and a second input connected to said second channel means, said phase comparison means being responsive to said first and to said second control signals for producing a servo input signal, servo means connected to said phase comparison means and to said bridge circuit and repsonsive to said servo input signal for varying the balance frequency of said bridge circuit.

4. A frequency-responsive electron-discharge device comprising a bridge circuit having first and second output terminals and a phase inverter circuit having first and second output terminals; means for applying an input signal to each of said circuits; a first channel means including a first comparison means having two inputs, one of said inputs connected to said first bridge output terminal and the other of said inputs connected to said first phase inverter output terminal, said first comparison means thereby adding the output signals produced at said first bridge and said first phase inverter output terminals to derive a first control signal; a second channel means including a second comparison means having two inputs, one of said inputs connected to said second bridge output terminal and the other of said inputs connected to said second phase inverter output terminal, said second comparison means thereby adding the output signals produced at said second bridge and said second phase inverter output terminals to derive a second control signal the phase of which always differs from the phase of said first signal by an integral multiple of $\pi$ radians; phase comparison means having a first input connected to said first channel means and a second input connected to said second channel means, said phase comparison means being responsive to said first and to said second control signals for producing a unidirectional servo input signal the polarity of which depends on the relative phases of said first and said second control signals; and servo means connected to said phase comparison means and to said bridge circuit means and responsive to said servo input signal for varying the balance frequency of said bridge circuit in a direction dependent upon said polarity.

5. A frequency-responsive electron-discharge device comprising a bridge circuit having first and second output terminals and a phase inverter circuit having first and second output terminals; means for applying an input signal to each of said circuits; a first channel means including a first comparison means having two inputs, one of said inputs connected to said first bridge output terminal and the other of said inputs connected to said first phase inverter output terminal, said first comparison means thereby adding the output signals produced at said first bridge and said first phase inverter output terminals to derive a first control signal; a second channel means including a second comparison means having two inputs, one of said inputs connected to said second bridge output terminal and the other of said inputs connected to said second phase inverter output terminal, said second comparison means thereby adding the output signals produced at said second bridge and said second phase inverter output terminals to derive a second control signal the phase of which always differs from the phase of said first signal by an integral multiple of $\pi$ radians; phase comparison means comprising a pair of electron-discharge devices, each of said devices having a cathode, an anode, and a grid; means for coupling said first control signal to the anode of one of said devices and to the cathode of the other of said devices; means for coupling the grids of said devices to said second control signal, said phase comparison means thereby producing a unidirectional servo input signal at the junction of the anode of said other device and the cathode of said one device; servo means connected to said junction and to said bridge circuit and responsive to said servo input signal for varying the balance frequency of said bridge circuit.

References Cited in the file of this patent

UNITED STATES PATENTS

| | | |
|---|---|---|
| 2,146,526 | Buschbeck | Feb. 7, 1939 |
| 2,290,327 | Hansell | July 21, 1942 |
| 2,480,128 | Frum | Aug. 30, 1949 |
| 2,489,262 | Buckbee | Nov. 29, 1949 |
| 2,559,680 | Secker | July 10, 1951 |
| 2,708,718 | Weiss | May 17, 1955 |